(12) United States Patent
Nakasendo et al.

(10) Patent No.: US 7,943,895 B2
(45) Date of Patent: May 17, 2011

(54) WAVELENGTH SPLITTING ELEMENT, METHOD FOR MANUFACTURING THE SAME AND OPTICAL MODULE

(75) Inventors: Kazuyuki Nakasendo, Ebina (JP); Masaki Iwamoto, Miyazaki (JP); Ayumu Kobayashi, Miyazaki (JP)

(73) Assignee: Epson Toyocom Corporation, Tokyo (JP)

( * ) Notice: Subject to any disclaimer, the term of this patent is extended or adjusted under 35 U.S.C. 154(b) by 1093 days.

(21) Appl. No.: 11/723,355

(22) Filed: Mar. 19, 2007

(65) Prior Publication Data
US 2010/0264299 A1 Oct. 21, 2010

(30) Foreign Application Priority Data

Mar. 20, 2006 (JP) .................................. 2006-076344

(51) Int. Cl.
H01L 31/0232 (2006.01)
G02B 27/10 (2006.01)
B32B 37/02 (2006.01)

(52) U.S. Cl. ................. 250/226; 250/227.23; 359/634; 156/154

(58) Field of Classification Search ............ 250/227.11, 250/227.23, 226; 385/24, 34, 39, 47; 398/79, 398/82, 85, 86; 359/633, 634, 638, 639, 359/643; 156/153, 154

See application file for complete search history.

(56) References Cited

U.S. PATENT DOCUMENTS

| | | | | |
|---|---|---|---|---|
| 5,880,889 A | * | 3/1999 | Neumann et al. | 359/634 |
| 6,647,175 B1 | * | 11/2003 | LoRegio et al. | 385/24 |
| 6,819,497 B2 | * | 11/2004 | Suzuki et al. | 359/634 |
| 7,072,540 B1 | * | 7/2006 | Szapiel et al. | 385/24 |
| 7,088,884 B2 | * | 8/2006 | Gerken et al. | 385/24 |
| 7,215,885 B2 | * | 5/2007 | Yamane et al. | 398/85 |
| 7,231,116 B2 | * | 6/2007 | Tanaka et al. | 385/34 |
| 7,389,050 B2 | * | 6/2008 | Minakawa et al. | 398/85 |
| 7,414,793 B2 | * | 8/2008 | Cianciotto | 359/634 |
| 7,415,210 B2 | * | 8/2008 | Gurevich et al. | 398/86 |
| 7,486,891 B1 | * | 2/2009 | Yao et al. | 398/85 |
| 2004/0004769 A1 | * | 1/2004 | Suzuki et al. | 359/640 |
| 2005/0046942 A1 | * | 3/2005 | Haase et al. | 359/495 |
| 2005/0063423 A1 | * | 3/2005 | Minakawa et al. | 370/534 |
| 2005/0117201 A1 | * | 6/2005 | Yamane et al. | 359/333 |
| 2005/0174664 A1 | * | 8/2005 | Ito et al. | 359/883 |
| 2007/0154218 A1 | * | 7/2007 | Sommer | 398/85 |
| 2008/0069566 A1 | * | 3/2008 | Mori et al. | 398/85 |
| 2008/0123196 A1 | * | 5/2008 | Cianciotto | 359/634 |
| 2010/0264299 A1 | * | 10/2010 | Nakasendo et al. | 250/226 |

FOREIGN PATENT DOCUMENTS

| | | |
|---|---|---|
| JP | A-7-209516 | 8/1995 |
| JP | A 2000-143264 | 5/2000 |
| JP | A 2000-199810 | 7/2000 |
| JP | A 2004-233501 | 8/2004 |
| JP | A 2005-164971 | 6/2005 |
| JP | A 2006-84861 | 3/2006 |

* cited by examiner

Primary Examiner — John R Lee
(74) Attorney, Agent, or Firm — Oliff & Berridge, PLC

(57) ABSTRACT

A wavelength splitting element for splitting a multiplexed light beam into separate wavelength bands and emitting the beams from separate emission ports including a first filter for splitting the multiplexed light beam into light beams in wavelength band λ1, which passes in a first direction, and wavelength bands λ2 and λ3, which reflects; a second filter, for splitting the reflected light into light beams in wavelength band λ3, which passes in a second direction, and wavelength band λ2, which reflects in a third direction; and a third filter, for passing the light beam in the wavelength band λ2. The first filter passes the light beam in the wavelength band λ2 reflected by the second filter and incident to the first filter again based on an incident angle, and the third filter passes only the light beam in the wavelength band λ2 that the first filter passes in the third direction.

13 Claims, 13 Drawing Sheets

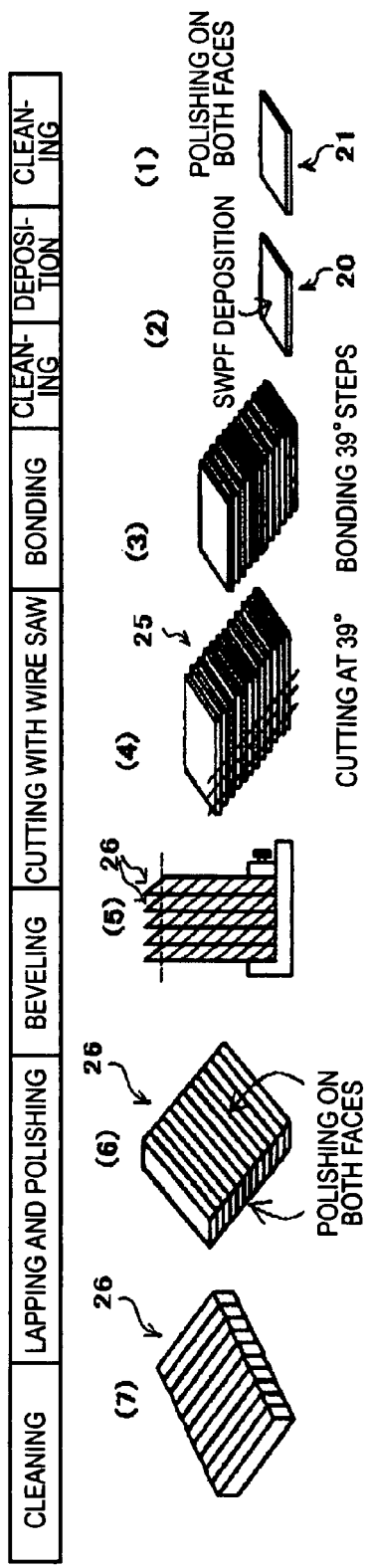
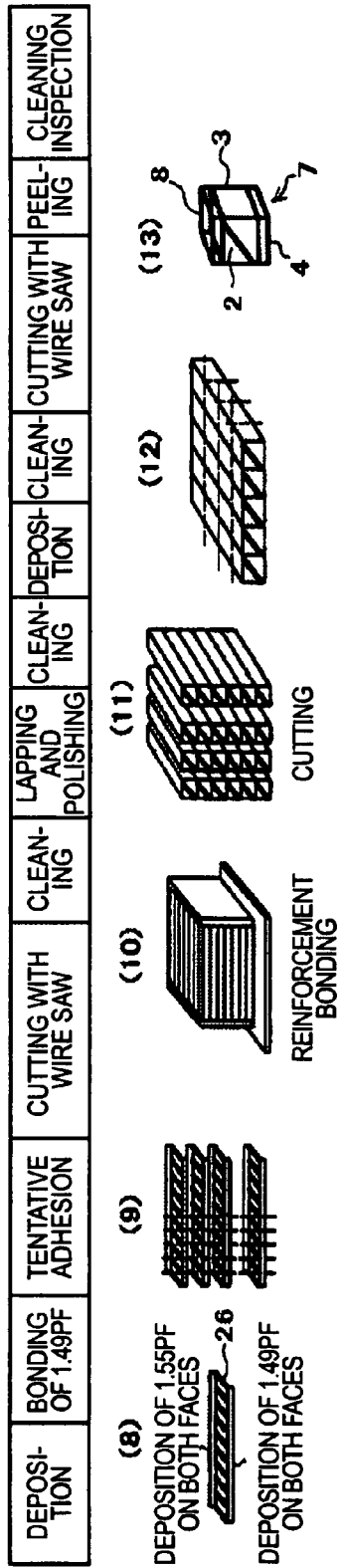
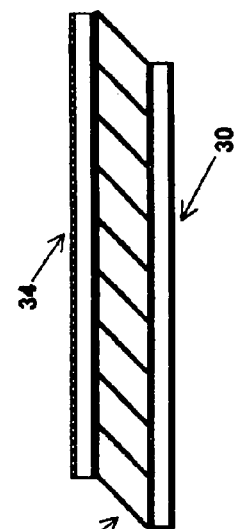
FIG. 9A
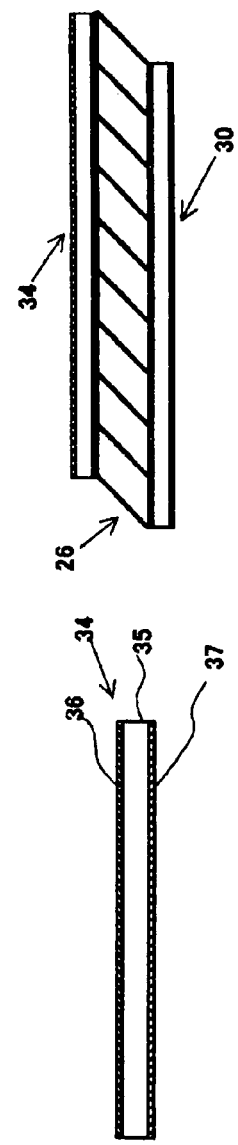
FIG. 9C
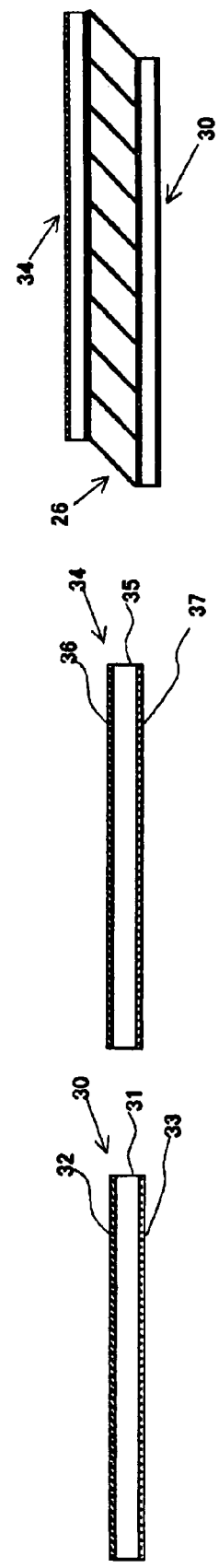
FIG. 9D
FIG. 9B

WAVELENGTH SPLITTING ELEMENT, METHOD FOR MANUFACTURING THE SAME AND OPTICAL MODULE

BACKGROUND

1. Technical Field

The present invention relates to a wavelength splitting element, a method for manufacturing thereof and an optical module. Particularly, it relates to improvement of characteristics of a wavelength splitting element, improvement of a method for manufacturing a wavelength splitting element and an optical module using an improved wavelength splitting element.

2. Related Art

Recently, high-density wavelength division multiplexing such suitable for large capacity communication such as a wavelength-division multiplexing (WDM) method has been increased to address an increased communication demand. Data transmission capacity in the WDM method for multiplexing light signals with different wavelengths into a single optical fiber is determined based on the data transmission rate per wavelength and the number of wavelengths to multiplex.

JP-A-2005-164971 discloses a wavelength splitting element used in the WDM method and an optical module. FIG. 10 shows a structure of a wavelength splitting element 50 having two filters 51 and 52. The filters 51 and 52 includes filter films 51b and 52b, respectively, that form multilayer films made of $SiO_2$, $TiO_2$ or the like on one side of respective light transmission members 51a and 52a made of quartz, glass or the like. The filters 51 and 52 are arranged such that the normal direction of the filter film 51b is inclined at 45 degrees relative to X-axis of the coordinate axes (as shown at the right bottom in the drawing), the normal direction of the filter film 52b is inclined at an angle θ2 (6 degrees) and the filter films 51b and 52b face each other. The filter film 51b has wavelength characteristics, when a multiplexed light beam (in the wavelength bands λ1, λ2 and λ3) is incident at an angle of 45 degrees, to pass a light beam in the wavelength band λ1 (1260 nm to 1360 nm) and reflects a light beam in the wavelength band λ2α (1480 nm to 1560 nm) or higher, and when a multiplexed light beam is incident at an angle of 33 degrees, the filter film 51b reflects a light beam in the wavelength band λ2 or lower and passes a light beam in the wavelength band λ3 (1539 nm to 1620 nm) or higher.

When a multiplexed light beam (in the wavelength bands λ1, λ2 and λ3) is incident to the filter 51 of the wavelength splitting element 50 at an angle of 45 degrees to the normal line of the filter film 51b, the filter film 51b passes a light beam in the wavelength band λ1 and reflects a light beam in the wavelengths bands λ2 and λ3. The light beam (in the wavelength bands λ2 and λ3) reflected by the filter film 51b is incident to the filter 52 at an angle θ2 (6 degrees) relative to the normal line of the filter film 52. The filter film 52 passes the light beam in the wavelength band λ3 and reflects the light beam in the wavelength band λ2. The light beam reflected by the filter film 52b (in the wavelength band λ2) is incident to the filter film 51 at an angle θ3 (=45 degrees−2×θ2=33 degrees) and passes through the filter film 51. As described above, the wavelength splitting element 50 has a function of splitting a multiplexed light beam (in the wavelength bands λ1, λ2 and λ3) to light beams in the separate wavelength bands λ1, λ2 and λ3, and emitting the split light beams in separate directions a, b and c.

On the other hand, when light beams in the wavelength bands λ1, λ3 and λ2 are incident from the directions a, b and c, a multiplexed light beam (in the wavelength bands λ1, λ2 and λ3) can be acquired from a light path 53.

FIG. 11 shows a wavelength splitting element 54 with the same structure as that shown in FIG. 10, except the shape of the light transmission member. For example, glass is machined to a cube, and then the cube is split along the line f-f in FIG. 11 to form light transmission members 55a and 56a. A filter film 55b is provided on the face of one of the split faces, and the split faces are joined again to form a cube-shaped prism. A filter film 56b is formed on the face of the light transmission member 56a which is in the direction in which a light beam is reflected by the filter film 55b and from which a light beam is emitted. Next, an optical fiber held by a ferule is joined to an incident light path of light of the wavelength splitting element 54. As is the case with the filter film 51b and 52b as shown in FIG. 10, the filter films 55b and 56b are formed from a multilayer film made from $SiO_2$, $TiO_2$ or the like, and they have the same wavelength characteristics as the filter films 51b and 52b. The operation of the wavelength splitting element 54 is the same as that of the wavelength splitting element 50 shown in FIG. 10.

Meanwhile, JP-A-2000-143264 discloses a method for manufacturing for an optical device (beam splitter) by integrating two rectangular triangle prisms by joining slopes of the two prisms. FIG. 12 is a manufacturing process flow diagram of the beam splitter. FIGS. 13A, 13B and FIGS. 14A to 14F are process drawings for explaining the method for manufacturing of the beam splitter. A glass flat plate 60 shown in FIG. 13A has a structure in which a polarization split film 62 is formed on the top face and a matching film 63 on the bottom face of a glass plate 61. A plurality of glass flat plates 60 having exactly the same structure are used to form a laminated body. FIG. 13B shows a state in which the glass flat plates 60 are laminated at an angle of inclination of 45 degrees with use of a jig 64. The jig 64 is composed of a horizontal plate-shaped base 64a and an inclined side wall 64b which is fixed to the base 64a at an angle of inclination of 45 degrees relative to the base 64a. The glass flat plates 60 are sequentially laminated on the base 64a with the polarization split films 62 facing upward. At this time, one of the ends of each glass flat plate 60 is aligned along the inclined side wall 64b, and thereby the step-shaped laminated body 65 is formed in which the glass flat plates 60 are displaced with each other at an equal distance in the face direction. That is, a laminated body having a substantial parallelogram front view is formed. The glass flat plates 60 are joined to one another with an UV curing-type optical adhesive.

Next, as shown in FIG. 14A, the laminated body 65 that has been integrated by adhesive is cut along the dotted lines showing the angle of inclination of 45 degrees by a plurality of cutting planes 65a that are in parallel with each other at a given pitch using a wire saw or the like, and thereby split laminated bodies 66 that have been cut into pieces are obtained as shown in FIG. 14B. FIG. 14C shows the state in which the split laminated bodies 66 are placed horizontally. Top and bottom faces (i.e., cutting planes) of the split laminated bodies 66 are mirror polished and a reflective coat is coated on all faces. Portions with an acute angled protrusion at both ends of each split laminated body 66 may be cut. Alternatively, as shown in FIG. 14D, at first, the split laminated bodies 66 may be laminated in correct alignment to form the laminated body 67, and then the laminated body 27 may be cut after being tentatively adhered. The plurality of tentatively adhered split laminated bodies 66 are cut with the wire saw along the cutting planes 67a that are perpendicular to the above-described cutting planes 65a, and thereby a connected body 68 of the beam splitter shown in FIG. 14A is formed. Next, the cutting planes are mirror polished, and the beam splitter connected body 68 is cut along the dotted line 68a shown in FIG. 14E, and thereby a beam splitter 69 shown in FIG. 14F is obtained. This method for manufacturing is disclosed in JP-A-2000-143264.

However, the wavelength splitting element disclosed in JP-A-2005-164971 (FIG. 11, etc.) has caused poor isolation at individual emission ports. To improve isolation of the emission port by 30 dB or more by deposition of a multilayer film made from $SiO_2$, $TiO_2$ or the like, a multilayer film composed of approx. 60 to 100 layers need be formed, which causes poor yield. Further, internal stress of a thin film might cause coming off of the adhesion face and deterioration in reliability.

Further, although JP-A-2005-164971 discloses the structure of the wavelength splitting element, it does not disclose the method for manufacturing thereof.

Further, although JP-A-JP2000-143264 discloses the method for manufacturing of the beam splitter, it is difficult to conceive the method for manufacturing a wavelength splitting element even if the method is employed.

SUMMARY

An advantage of the invention is to provide an improved wavelength splitting element, an improved method for manufacturing a wavelength splitting element and an optical module.

According to a first aspect of the invention, a wavelength splitting element for splitting a multiplexed light beam in wavelength bands $\lambda 1$, $\lambda 2$ and $\lambda 3$ into light beams in separate wavelength bands and emitting the split light beams from separate emission ports, includes a first filter for splitting the multiplexed light beam in the wavelength bands $\lambda 1$, $\lambda 2$ and $\lambda 3$ into a light beam in the wavelength band $\lambda 1$ that the first filter passes in a first direction and into a light beam in the wavelength bands $\lambda 2$ and $\lambda 3$ that the first filter reflects, a second filter, which is provided in the direction of the light beam in the wavelength bands $\lambda 2$ and $\lambda 3$ that has been reflected by the first filter, for splitting the light beam in wavelength bands $\lambda 2$ and $\lambda 3$ that has been reflected by the first filter into a light beam in the wavelength band $\lambda 3$ that the second filter passes in a second direction and into a light beam in the wavelength band $\lambda 2$ that the second filter reflects; and a third filter, which is provided in the direction of the light beam that has been reflected by the second filter, for passing the light beam in the wavelength band $\lambda 2$ that has been reflected by the second filter, wherein the first filter has characteristics to pass the light beam in the wavelength band $\lambda 2$ that has been reflected by the second filter and incident to the second filter again in a third direction depending on an incident angle, and the third filter has characteristics to pass only the light beam in the wavelength band $\lambda 2$ out of the light beams that the first filter passes in the third direction. Such a structure of the wavelength splitting element improves isolation at a port (Port b) in the third direction by 30 dB or more compared to an existing example. To improve isolation by 30 dB or more in an existing example, a multilayer film composed of approx. 60 to 100 layers need be formed, which causes poor yield and quality. Further, the multilayer film can be split by forming the filter films on both sides of a rectangular plate-shaped light transmission member. Accordingly, the number of multilayer films per side can be reduced by half, and the above-mentioned problem can be resolved.

According to a second aspect of the invention, a wavelength splitting element for splitting a multiplexed light beam in wavelength bands $\lambda 1$, $\lambda 2$ and $\lambda 3$ into light beams in separate wavelength bands and emitting the split light beams from separate emission ports, includes a first filter for splitting the multiplexed light beam in the wavelength bands $\lambda 1$, $\lambda 2$ and $\lambda 3$ into a light beam in the wavelength band $\lambda 1$ that the first filter passes in a first direction and into a light beam in the wavelength bands $\lambda 2$ and $\lambda 3$ that the first filter reflects, a fourth filter, which is provided in the direction of the light beam in the wavelength bands $\lambda 2$ and $\lambda 3$ that has been reflected by the first filter, for splitting the light beam in wavelength bands $\lambda 2$ and $\lambda 3$ that has been reflected by the first filter into a light beam in the wavelength band $\lambda 3$ that the fourth filter passes in a second direction and into a light beam in the wavelength band $\lambda 2$ that the fourth filter reflects, and a third filter, which is provided in the direction of the light beam that has been reflected by the fourth filter, for passing the light beam in the wavelength band $\lambda 2$ that has been reflected by the fourth filter, wherein the first: filter has characteristics to pass the light beam in the wavelength band $\lambda 2$ that has been reflected by the fourth filter and incident to the fourth filter again in a third direction depending on an incident angle, the third filter has characteristics to reflect the light beam in the wavelength band $\lambda 3$ and to pass only the light beam in the wavelength band $\lambda 2$ out of the light beams that the first filter passes in the third direction, and the fourth filter has characteristics to reflect the light beam in the wavelength band $\lambda 2$ and pass the light beam in the wavelength band $\lambda 3$ or higher.

According to the structure as described above, attachment of the filters at the second and third ports (Ports c and b) significantly improves isolation at the second and third ports. For example, in the existing example, transmission loss of light in the wavelength band $\lambda 3$ at the second port is 0.3 dB or less, and transmission loss of light in the wavelength band $\lambda 2$ is approx. 30 dB. On the other hand, according to the structure as described above, transmission loss of light in the wavelength band $\lambda 3$ at the second port is approx. 0.4 dB to 0.5 dB, and transmission loss of light in the wavelength band $\lambda 2$ is 60 dB or more.

It is preferable that a filter film of the first filter is formed on a joint face of a rectangular solid-shaped body that is formed by joining two slopes of right triangular-shaped prisms, and a filter film of the second filter is formed on one emission face of the rectangular solid-shaped body, and the third filter formed with a 3-1th and a 3-2th filter films on respective sides of a plate-shaped optical member is joined to the other emission face of the rectangular solid-shaped body.

This structure, which is put into practical use, improves isolation at the port in the third direction (Port b) by 30 dB or more compared to the existing example.

It is also preferable that a filter film of the first filter be formed on a rectangular solid-shaped joint face formed by joining each slope of two rectangular solid-shaped prisms, the fourth filter formed with the 4.1th filter film and the 4.2th filter film on both sides of the plate-shaped optical glass plate be joined to one of the emission faces of the rectangular solid-shaped prisms, and the third filter formed with the 3.1th filter film and the 3.2th filter film on both sides of the plate-shaped optical glass plate be joined to the other emission face of the rectangular solid-shaped prisms.

This structure, which is put into practical use, increases the transmission loss of light in the wavelength band $\lambda 3$ at the second port by approx. 0.1 dB compared to the existing example and the transmission loss of light in the wavelength band $\lambda 2$ to 60 dB ore more.

According to a third aspect of the invention, an optical module splits for splitting a multiplexed light beam in wavelength bands $\lambda 1$, $\lambda 2$ and $\lambda 3$ into light beams in separate wavelength bands, includes a phototransistor for detecting the split light beams in separate wavelength bands at separate emission ports, wherein a wavelength splitting element as described above is used.

According to a fourth aspect of the invention, a method for manufacturing a wavelength splitting element formed by joining slopes of two triangular-shaped prisms includes forming a first filter film on a rectangular plate-shaped optical member, forming a laminated body by laminating a plurality of rectangular plate-shaped optical members formed with the first filter film via an adhesive, and sequentially laminating the rectangular plate-shaped optical members with displaced face directional positions so that a plane connecting ends of the plate-shaped optical members and a plate face of the plate-shaped optical member creates an angle of inclination of 39 degrees, cutting the laminated body that has been integrated in the laminated body cutting process along the angle of inclination of 39 degrees into a plurality of split laminated bodies by a plurality of cutting planes that are in parallel with each other at a given pitch, mirror polishing the cutting plane of the split laminated body formed in the cutting process; forming a second filter film on one mirror polished face of the split laminated body; tentatively adhering the plurality of split laminated bodies formed with the second filter film with an tentative adhesive so that the first filter films are laminated in correct alignment, separating the plurality of split laminated bodies that have been tentatively adhered by the tentative adhesive along a cutting plane which is perpendicular to the cutting plane in the cutting process, and thereby forming a tentatively adhered laminated body, mirror polishing the cutting plane of the tentatively adhered laminated body obtained by the separating process, forming a wavelength splitting element connected body in which a plurality of wavelength splitting elements are connected in series via the tentative adhesive by cutting the tentatively adhered laminated body along the direction which is perpendicular to the cutting plane at a given interval, and splitting the wavelength splitting element connected body into separate wavelength splitting elements by melting the tentatively adhesive composing the wavelength splitting element connected body.

Use of the method for manufacturing a wavelength splitting element provides a small wavelength splitting element with good performance at a low cost.

According to a fifth aspect of the invention, a method for manufacturing a wavelength splitting element formed by joining slopes of two triangular-shaped prisms includes forming a first filter film on a rectangular plate-shaped optical member, forming a laminated body by laminating a plurality of rectangular plate-shaped optical members formed with the first filter film via an adhesive, and sequentially laminating the rectangular plate-shaped optical members with displaced face directional positions so that a plane connecting ends of the plate-shaped optical members and a plate face of the plate-shaped optical member creates an angle of inclination of 39 degrees, cutting the laminated body that has been integrated in the laminated body cutting process along the angle of inclination of 39 degrees into a plurality of split laminated bodies by a plurality of cutting planes that are in parallel with each other at a given pitch, mirror polishing the cutting plane of the split laminated body formed in the cutting process, forming a second filter film on one mirror polished face of the split laminated body, forming third and fourth filter films on respective faces of a rectangular plate-shaped optical member, joining the plate-shaped optical member formed with the third and fourth filter films to the split laminated bodies formed with second filter films, tentatively adhering the split laminated bodies joined with the plate-shaped optical member formed with the third and fourth filter films with an tentative adhesive so that the first filter film is laminated in correct alignment, separating the plurality of split laminated bodies that have been tentatively adhered by the tentative adhesive along a cutting plane which is perpendicular to the cutting plane in the cutting process, and thereby forming a tentatively adhered laminated body, mirror polishing the cutting plane of the tentatively adhered laminated body obtained by the separating process, forming a wavelength splitting element connected body in which a plurality of wavelength splitting elements are connected in series via the tentative adhesive by cutting the tentatively adhered laminated body along the direction which is perpendicular to the cutting plane at a given interval, and splitting the wavelength splitting element connected body into separate wavelength splitting elements by melting the tentatively adhesive composing the wavelength splitting element connected body.

Use of the method for manufacturing a wavelength splitting element provides a small wavelength splitting element with good performance and improved isolation at a low cost.

According to a sixth aspect of the invention, a method for manufacturing a wavelength splitting element formed by joining slopes of two triangular-shaped prisms includes forming a first filter film on a rectangular plate-shaped optical member, forming a laminated body by laminating a plurality of rectangular plate-shaped optical members formed with the first filter film via an adhesive, and sequentially laminating the rectangular plate-shaped optical members with displaced face directional positions so that a plane connecting ends of the plate-shaped optical members and a plate face of the plate-shaped optical member creates an angle of inclination of 39 degrees, cutting the laminated body that has been integrated in the laminated body cutting process along the angle of inclination of 39 degrees into a plurality of split laminated bodies by a plurality of cutting planes that are in parallel with each other at a given pitch, mirror polishing the cutting plane of the split laminated body formed in the cutting process, forming third and fourth filter films on respective faces of a second rectangular plate-shaped optical member, joining the second plate-shaped optical member formed with the third and fourth filter films to one face of the split laminated body, forming fifth and sixth filter films on respective faces of a third rectangular plate-shaped optical member, joining the third plate-shaped optical member formed with the fifth and sixth filter films to the other face of the split laminated body, tentatively adhering the split laminated bodies joined with the third rectangular plate-shaped optical member formed with the fifth and sixth filter films with an tentative adhesive so that the first filter film is laminated in correct alignment, separating the plurality of split laminated bodies that have been tentatively adhered by the tentative adhesive along a cutting plane which is perpendicular to the cutting plane in the cutting process, and thereby forming a tentatively adhered laminated body, mirror polishing the cutting plane of the tentatively adhered laminated body obtained by the separating process, forming a wavelength splitting element connected body in which a plurality of wavelength splitting elements are connected in series via the tentative adhesive by cutting the tentatively adhered laminated body along the direction which is perpendicular to the cutting plane at a given interval, and splitting the wavelength splitting element connected body into separate wavelength splitting elements by melting the tentatively adhesive composing the wavelength splitting element connected body.

Use of the method for manufacturing a wavelength splitting element provides a small wavelength splitting element with good performance and improved isolation at a low cost.

In this case, a process of removing acute angled portions at both ends of the split laminated body may be interposed before the tentative adhesive process. Use of the manufacturing method remarkably reduces the defects of the mirror polished caused by powder with a broken acute angled portion thereof.

In this case, a UV adhesive may be used as the adhesive. Use of the manufacturing method simplifies the joining method, making curing easier and the curing time shorter.

In this case, paraffin may be used as the tentative adhesive. Use of the manufacturing method makes the tentative adhesion and splitting easier at a lower cost.

BRIEF DESCRIPTION OF THE DRAWINGS

The invention will be described with reference to the accompanying drawings, wherein like numbers reference like elements.

FIG. 9A is a manufacturing process flow diagram and FIGS. 9B, 9C and 9D are process drawings for explaining a third method for manufacturing a wavelength splitting element of the present invention.

DESCRIPTION OF EXEMPLARY EMBODIMENT

Embodiments of the invention will now be described with reference to the drawings.

Figure 1:
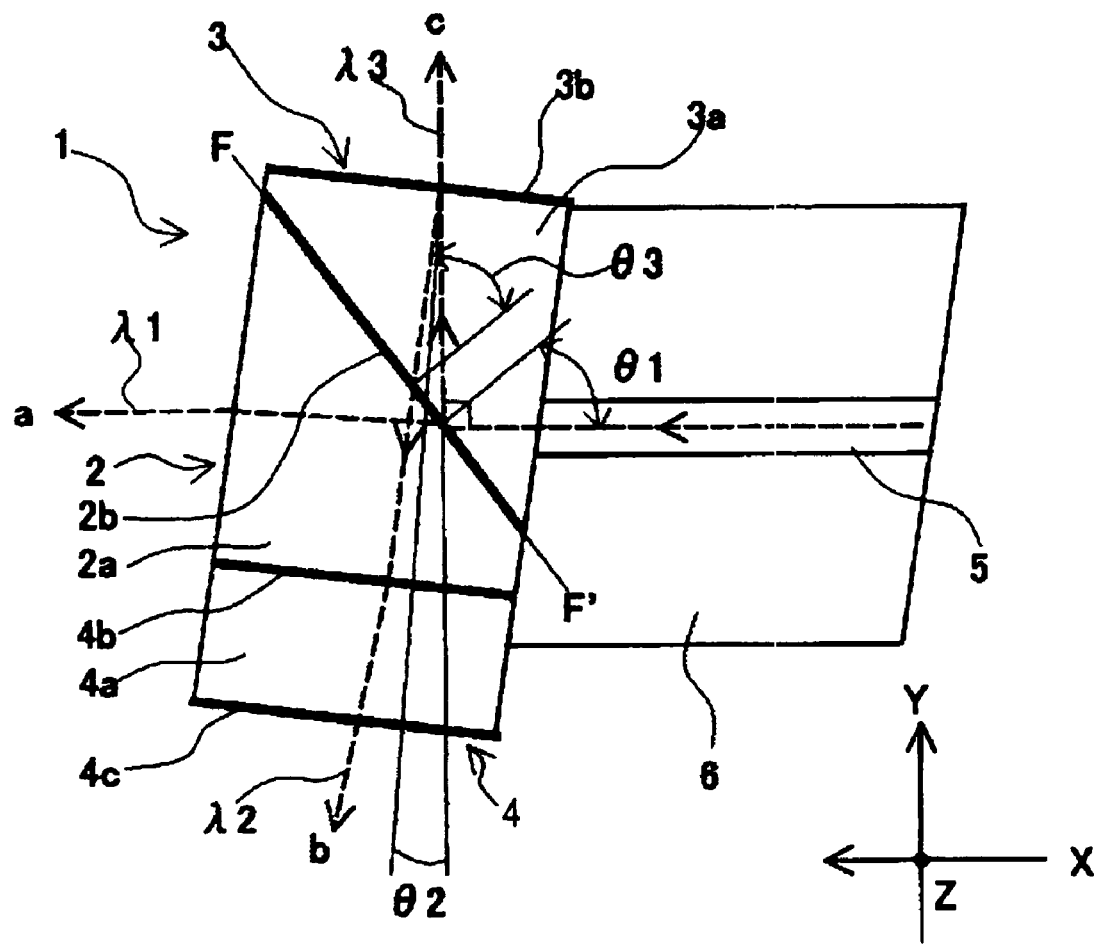
FIG. 1 is a schematic structure diagram showing a structure of a wavelength splitting element according to a first embodiment of the invention.

FIG. 1 shows a structure of a wavelength splitting element of a first embodiment of the invention. The wavelength splitting element 1 includes a first filter 2, a second filter 3 and a third filter 4. An optical fiber 5 held by a ferrule 6 is joined to an incident face of the wavelength splitting element 1. For forming the first filter 2, first of all, glass is processed into a rectangular solid shape, and then it is split the line F-F' in FIG. 1, and thereby light transmission members $2a$ and $3a$ are formed. A filter film $2b$ is formed on one of the split two faces, and the split faces are joined again to form a rectangular solid-shaped prism. Thus, the first filter 2 is composed of the light transmission member $2a$ and the filter film $2b$. Next, a filter film $3b$ is formed on the face of the light transmission member $3a$ which is in the direction in which a light beam is reflected by filter film $2b$ and from which a light beam is emitted, and thus the second filter is composed of the light transmission member $3a$ and the filter film $3b$. The third filter 4 is formed by forming filter films $4b$ and $4c$ on respective faces of a rectangular plate-shaped light transmission member $4a$ having approx. 0.5 mm in thickness. Next, the wavelength splitting element 1 is composed by joining the third filter 4 to a face of the light transmission member 2 which is opposite to the filter film $3b$ using adhesive.

The center of the optical fiber 5 held by the ferrule 6 is joined to the incident face of the wavelength splitting element 1 and fixed to it with adhesive.

As is commonly known, the filter films $2b$, $3b$, $4b$ and $4c$ of the filters 2, 3 and 4 are composed of a multilayer film in which thin films made from $SiO_2$ and $TiO_2$ are alternately laminated. The filter film $2b$ has wavelength characteristics, when a multiplexed light beam (in the wavelength bands $\lambda 1$, $\lambda 2$ and $\lambda 3$) is incident at an incidence angle of 45 degrees to the normal direction of the filter film $2b$, to pass a light beam in the wavelength band $\lambda 1$ (1,260 nm to 1,360 nm) and reflects a light beam in the wavelength band $\lambda 2\alpha$ (1,480 nm to 1,560 nm) or higher. When a light beam is incident at an incidence angle of 33 degrees to the normal direction of the filter film $2b$, the filter film $2b$ has wavelength characteristics to pass a light beam in the wavelength band $\lambda 2$ (1,480 nm to 1,560 nm) or lower and reflect a light beam in a wavelength band higher than the wavelength band $\lambda 2$. On the other hand, the filter film $3b$ has wavelength characteristics to reflect a light beam in the wavelength band $\lambda 2$ or lower and pass a light beam in the wavelength band $\lambda 3$ (1,539 nm to 1,620 nm) (1.49/1.55 LWPF). The description of "1.49/1.55 LWPF (Long Wave Pass Filter) herein means that a light beam in the wavelength band 1.49 μl (1480 nm to 1500 nm) is reflected and a light beam in the wavelength band 1.55 μl (1539 nm to 1620 nm) is passed. In a similar manner, the description of "1.49/1.55 SWPF (Short Wave Pass Filter) herein means that a light beam in the wavelength band 1.49 μl (1480 nm to 1500 nm) is passed and a light beam in the wavelength band 1.55 μl (1539 nm to 1620 nm) is reflected.

Further, the filter film $4b$ has wavelength characteristics to pass a light beam in the wavelength band $\lambda 2$ or lower and reflect a light beam in the wavelength band $\lambda 3$ (1.49/1.55 SWPF). The filter film $4c$ has wavelength characteristics to reflect a light beam in the wavelength band $\lambda 1$ and pass a light beam in the wavelength band $\lambda 2$ or higher (1.31/1.49 LWPF). In other words, the filter films $4b$ and $4c$ form a bandpass filter that passes only a light beam in the wavelength band $\lambda 2$ (1,480 nm to 1,500 nm) (1.49 WPF).

As shown in FIG. 1, when a multiplexed light beam in the wavelength bands $\lambda 1$, $\lambda 2$ and $\lambda 3$ is incident from the optical fiber 5 at an incidence angle θ1 (45 degrees) relative to the normal direction of the filter film $2b$, a light beam in the wavelength band $\lambda 1$ passes through the filter film $2b$, and is emitted to a Port a in the first direction, and light beams in the wavelength bands $\lambda 2$ and $\lambda 3$ are reflected. The reflected light beams in the wavelength bands λ2 and λ3 are incident at angle θ2 (six degrees) relative to the normal direction of the filter film 3b. Then the light beam in the wavelength band λ3 passes through the filter film 3b, and is emitted to a Port b in the second direction. On the other hand, the light beam in the wavelength band λ2 is reflected at an angle θ2 (6 degrees) relative to the normal line of the filter film 3b. Next, the reflected light beam in the wavelength band λ2 is incident at an incidence angle θ3 (=θ1−2·θ2=33 degrees) relative to the normal direction of the filter film 2b, passes through the filter film 2b, and is incident to the filter 4. Next, the filter film 4b of the third filter 4 reflects a light beam in the wavelength band λ3 or higher, and passes only a light beam in the wavelength band λ2 or lower. Further, the filter film 4c reflects a light beam in the wavelength band λ1, and passes only a light beam in the band λ2 or higher and emits it in the direction of Port b. Attachment of the filter 4 significantly improves isolation at Port b.

Figure 11:
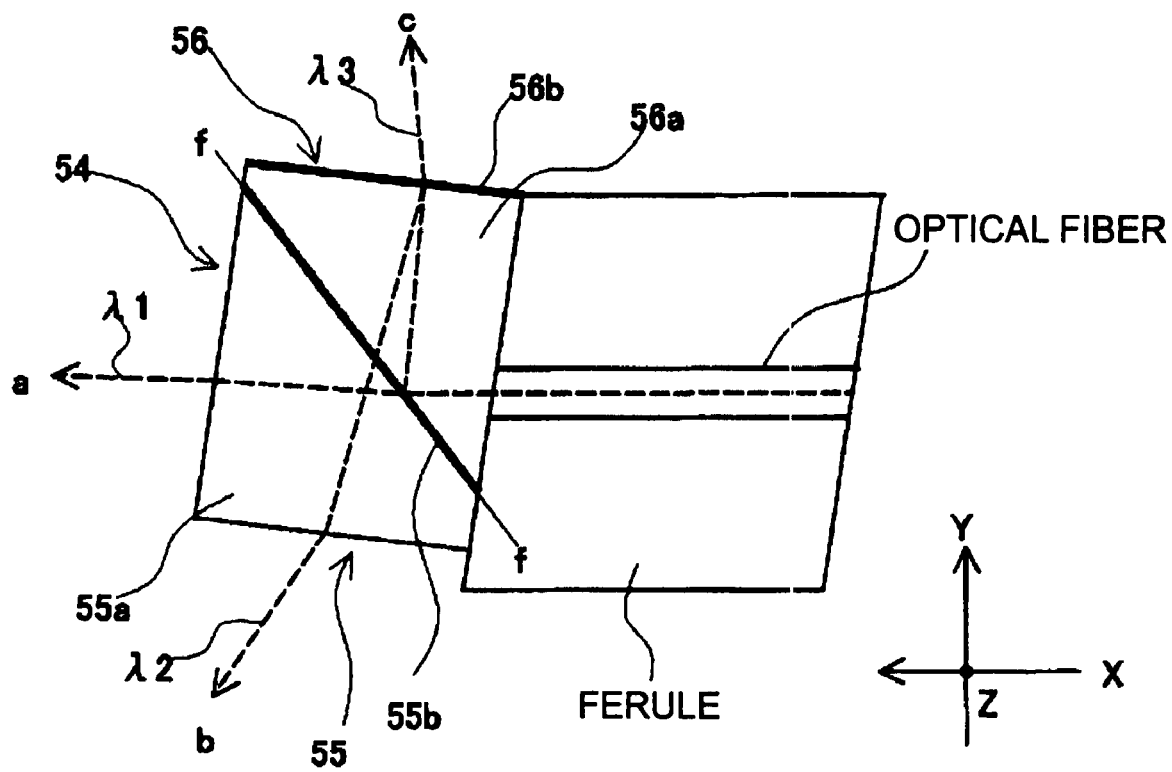
FIG. 11 is a diagram showing the structure of a conventional wavelength splitting element.
Figure 12:
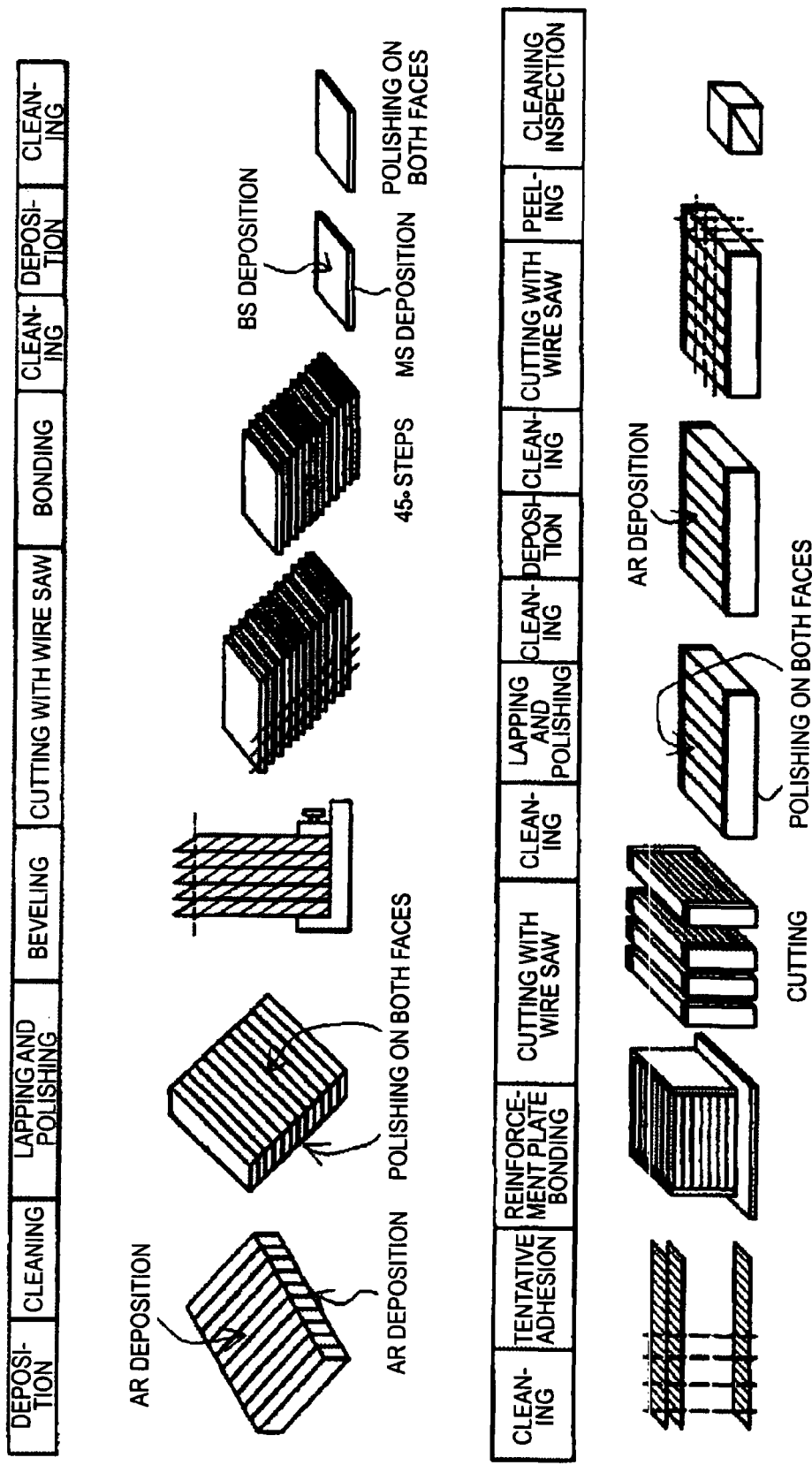
FIG. 12 is a manufacturing process flow diagram for explaining a conventional method for manufacturing an optical device.
Figure 13A:
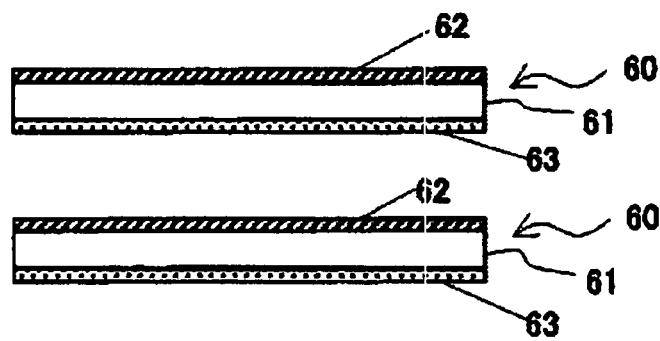
FIGS. 13A and 13B are process drawings for explaining a conventional method for manufacturing a wavelength splitting element.
Figure 13B:
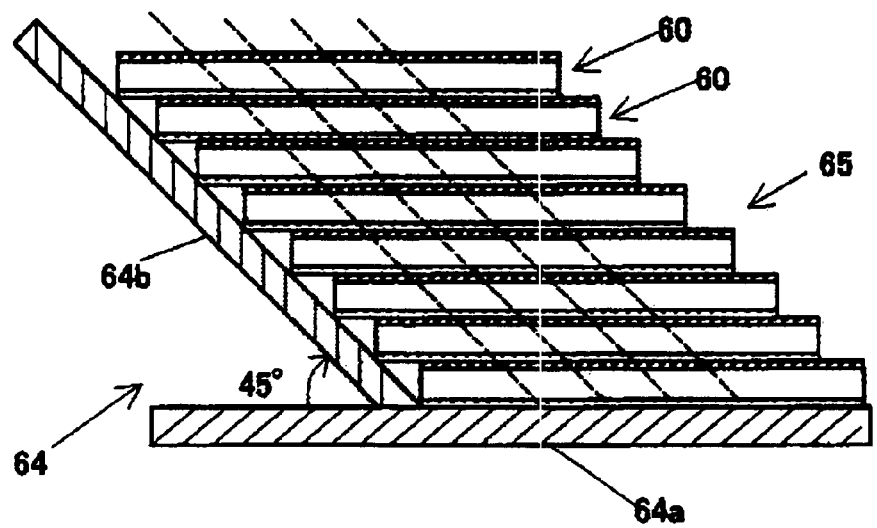
Figure 14A:
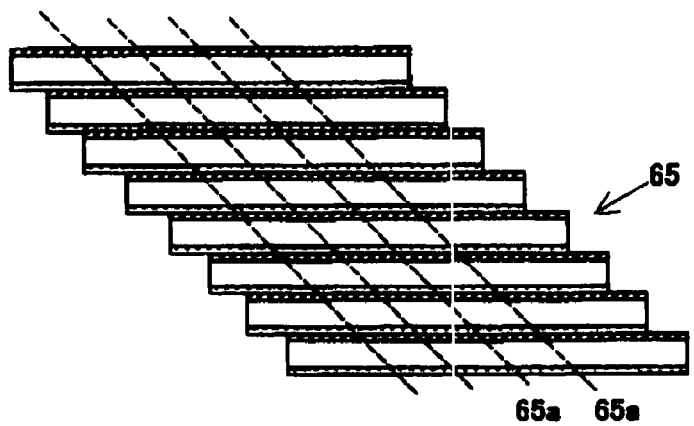
FIGS. 14A to 14F are process drawings for explaining a conventional method for manufacturing a wavelength splitting element.
Figure 14B:
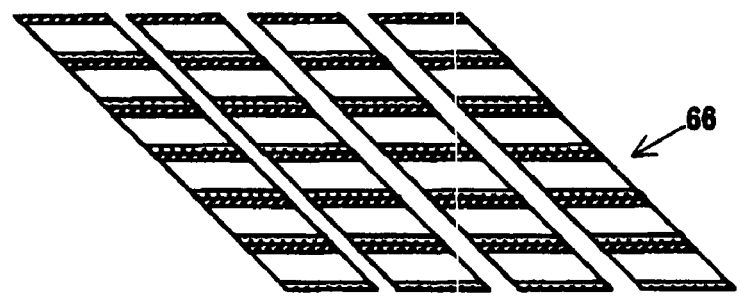
Figure 14C:
Figure 14D:
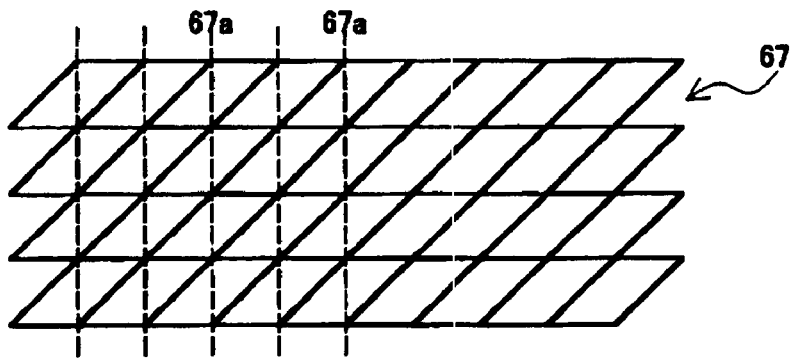
Figure 14E:
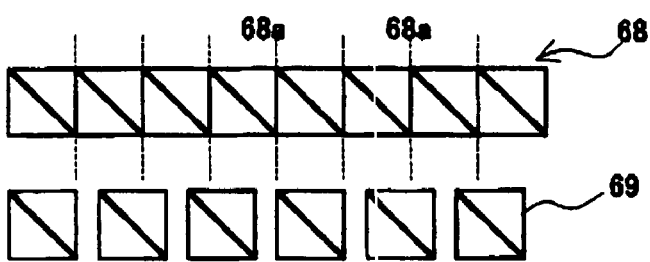
Figure 14F:

A structure of the wavelength splitting element according to the first embodiment as shown in FIG. 1 improves isolation at Port b by 30 dB or more compared to the existing example shown in FIG. 11. As in the existing example, to improve isolation by 30 dB or more by deposition of a multilayer film made from $SiO_2$, $TiO_2$ or the like to the emission face of the light transmission member 2a for the light beam in the wavelength band λ2, a multilayer film composed of approx. 60 to 100 layers need be formed, which causes poor yield. Further, internal stress of a thin film might cause coming off of the adhesion face and deterioration in reliability. On the other hand, since the multilayer film can be split to both faces by forming the filter films 4b and 4c on both sides of the rectangular plate-shaped light transmission member 4a, the number of multilayer films per side can be reduced by half, and yield of the multilayer films is improved. Further, since the multilayer films are split to both faces evenly, the light transmission member 4b does not warp.

Figure 2:
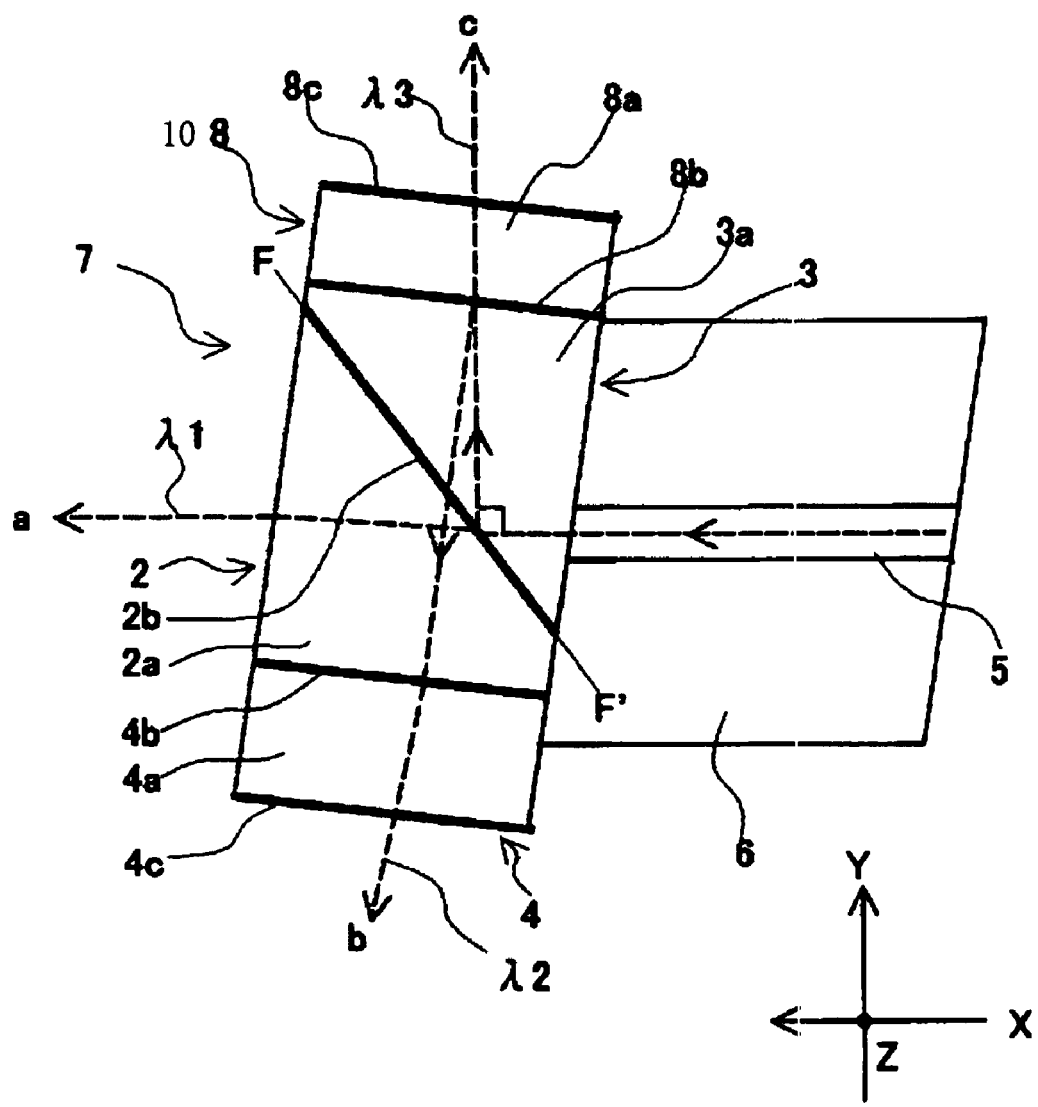
FIG. 2 is a schematic structure diagram showing a structure of a wavelength splitting element according to a second embodiment of the invention.

FIG. 2 shows a structure of a wavelength splitting element according to a second embodiment of the invention. A wavelength splitting element 7 is different from the structure shown in FIG. 1 only in that a filter film is not formed on a face of the light transmission member 3 which is in the direction of light reflected by the filter film 2b and from which a light beam is emitted, and, instead, a fourth filter 8 is joined using adhesive. The fourth filter 8 is formed by forming filter films 8b and 8c on respective faces of a rectangular plate-shaped light transmission member 8a having approx. 0.5 mm in thickness. The filter film 8b has wavelength characteristics to reflect a light beam in the wavelength band λ2 or lower and reflect a light beam in the wavelength band λ3 or higher (1.49/1.55 LWPF). Similarly, the filter film 8c has wavelength characteristic to reflect a light beam in the wavelength band λ2 or lower and pass a light beam in the wavelength band λ3 or higher (1.49/1.55 LWPF). As described above, the filter films 8b and 8c are formed on respective faces of the rectangular plate-shaped light transmission member 8a having approx. 0.5 mm in thickness, and thereby the multilayer film is split into both sides, and thus the light transmission member 8a does not warp.

The wavelength splitting element 7 according to the second embodiment has a structure in which the filters 4 and 8 have been attached to both Ports b and c. Accordingly, isolation at both Ports b and c is significantly improved.

For example, in the existing example shown in FIG. 11, transmission loss of light in the wavelength band λ3 at Port C is 0.3 dB or less and transmission loss of light in the wavelength band λ2 is approx. 30 dB. On the other hand, in the second embodiment, transmission loss of light in the wavelength band λ3 at Port c is approx. 0.4 dB to 0.5 dB and transmission loss of light in the wavelength band λ2 is 60 dB or more.

Figure 3:
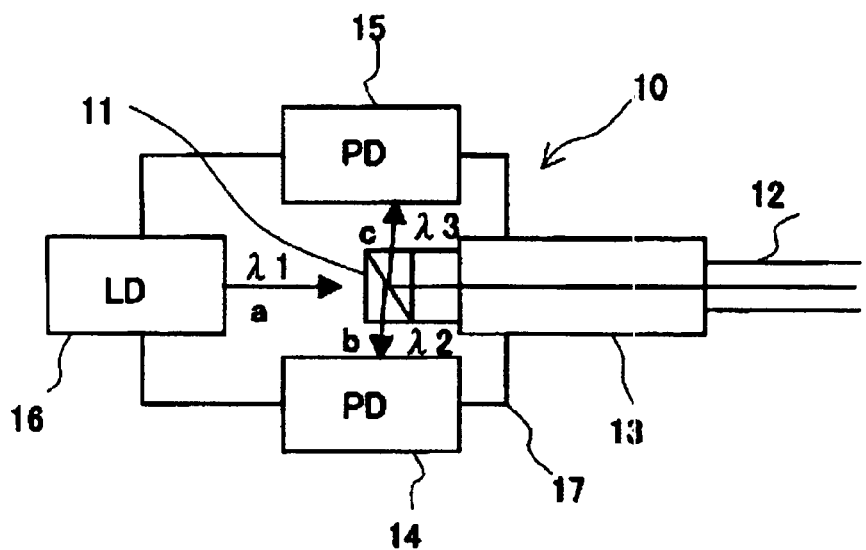
FIG. 3 is a block diagram showing a structure of an optical module according to a third embodiment of the invention.

Use of the wavelength splitting element enables not only splitting a multiplexed light beam into light beams in wavelength bands and emitting them, but also synthesizing light beams in given wavelengths band and making the synthesized light beam incident. FIG. 3 is a block diagram showing the structure of an optical module 10 according to a third embodiment of the invention. The optical module 10 includes an wavelength splitting element 11 which is explained in FIG. 1 or 2, an optical fiber 12, a ferrule 13 for holding the optical fiber 12, phototransistors (PD) 14 and 15 for detecting light and a laser diode (LD) 16. The optical fiber 12 passes light beams in the wavelength bands λ1, λ2 and λ3, and the wavelength splitting element 11 emits a light beam in the wavelength band λ2 in the direction b and emits a light beam in the wavelength band λ3 in the direction c. Further, the wavelength splitting element 11 makes a light beam in the wavelength band λ1 from the direction a. The phototransistors (PD) 14 and 15 are capable of detecting light beams in the wavelength bands λ2 and λ3 that are emitted in the directions b and c, respectively. The ferrule 13 for fixation is provided at the end of the optical fiber 12. Further, the phototransistors (PD) 14 and 15, the laser diode (LD) 16 and the ferrule 13 are installed at appropriate positions of a housing 17, respectively.

Figure 4:
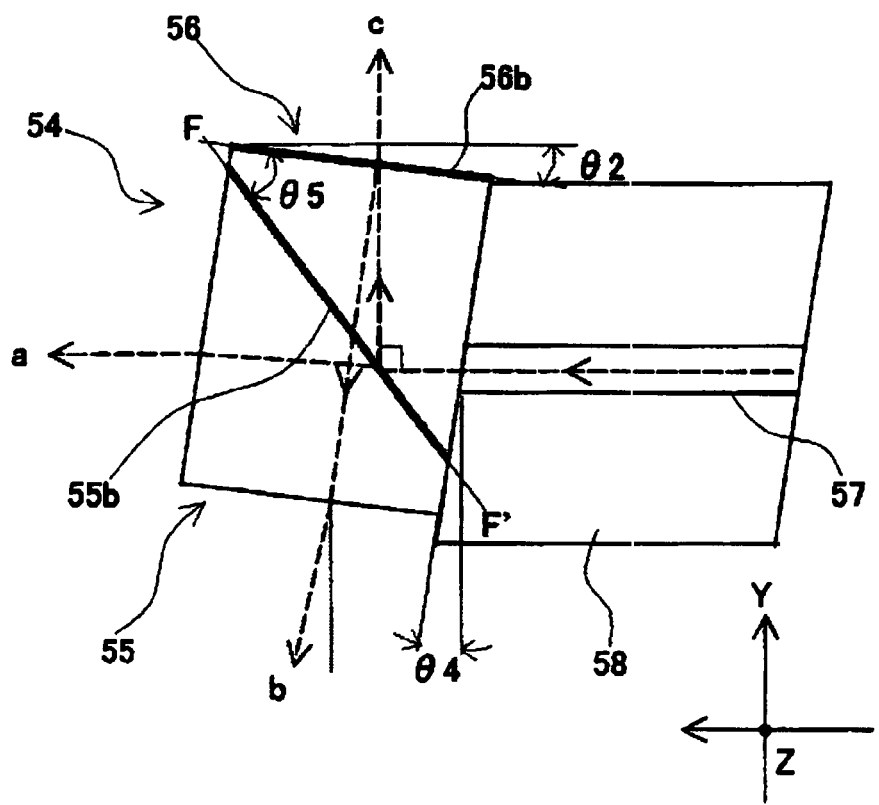
FIG. 4 is a diagram for explaining the method for manufacturing a wavelength splitting element according to the invention.

FIG. 4 shows a structure of the conventional wavelength splitting element 54. A first embodiment of an improved method for manufacturing the wavelength splitting element will now be explained. The wavelength splitting element 54 has a geometric structure in which, relative to the X, Y, Z rectangular coordinates (in which the Z-axis is the direction vertical to the drawing paper) as the reference, the filter film 55b of the filter 55 is arranged inclined relative to the X-axis at 45 degrees, and the reflection film 56b of the filter 56 is arranged inclined relative to the X-axis direction at an angle θ2 (6 degrees). Accordingly, the angle θ5 created by the filter films 55b and 56b is set to 39 degrees. The angle θ4 created by the emission face of the wavelength splitting element 54 and the Y-axis is set to 6 degrees.

Figure 5:
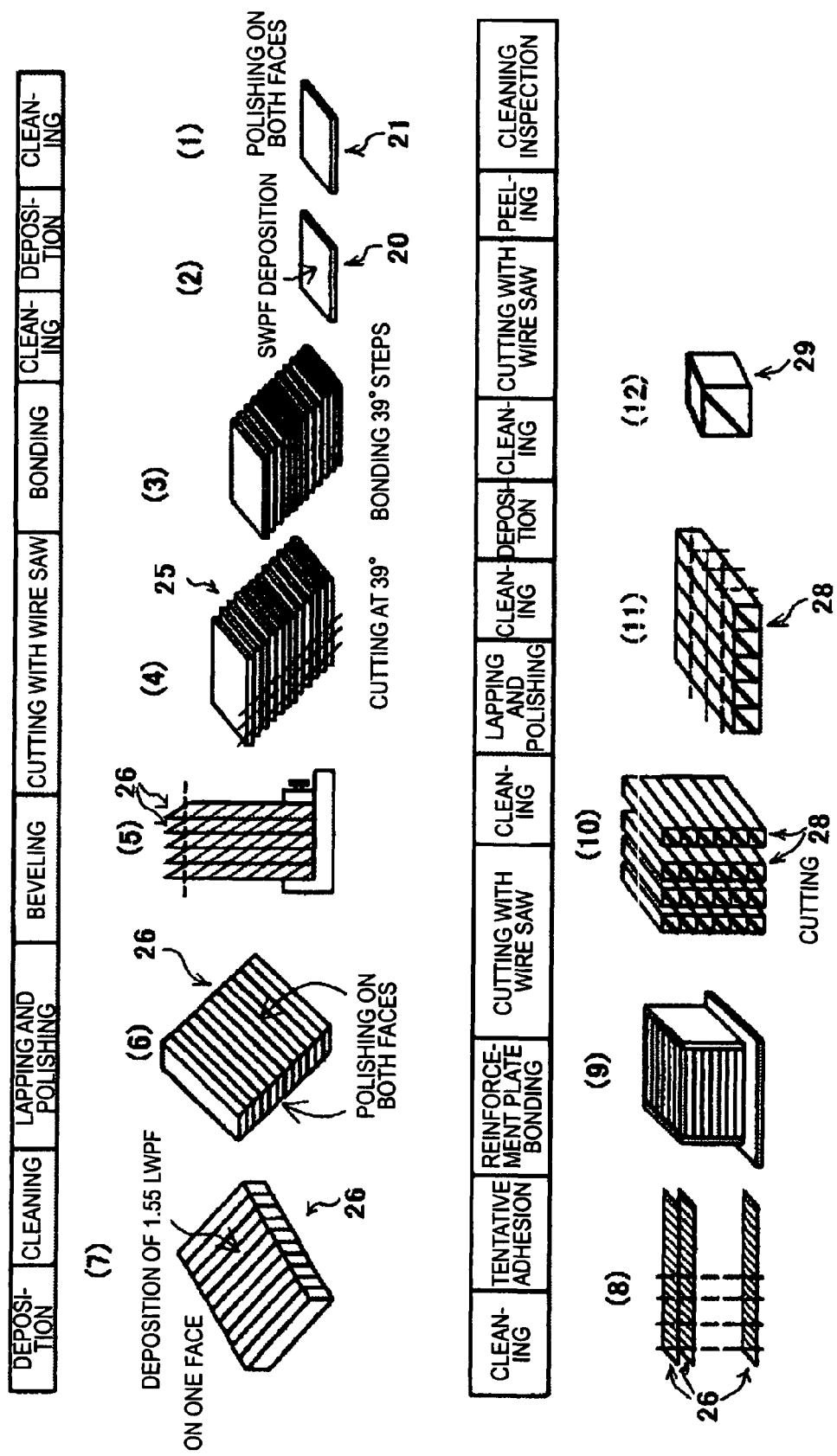
FIG. 5 is a manufacturing process flow diagram for explaining a first method for manufacturing a wavelength splitting element of the present invention.

FIG. 5 is a manufacturing process flow diagram for the wavelength splitting element 54 as shown in FIG. 4, and FIGS. 6A and 6B and FIGS. 7A to 7F are the process drawings for explaining the method for manufacturing the wavelength splitting element 54.

Figure 6A:
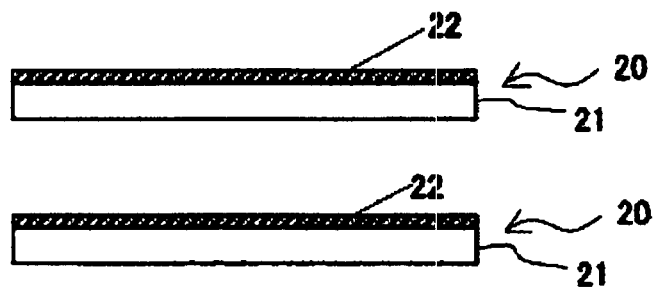
FIGS. 6A and 6B are process drawings for explaining the method for manufacturing a wavelength splitting element of the present invention.
Figure 6B:
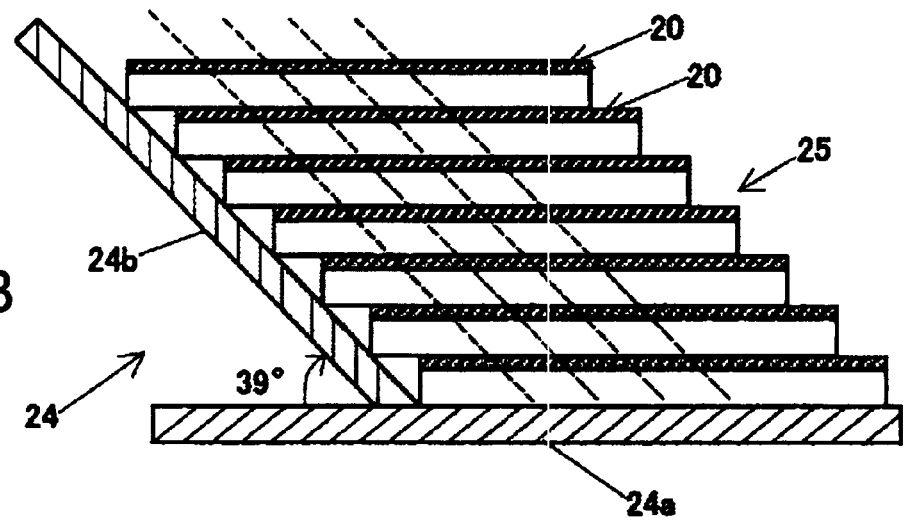

A glass flat plate 20 shown in FIG. 6A has a structure in which a filter film 22 (an SWPF, equivalent to the filter film 55b of FIG. 4) in one of both mirror polished faces of a glass plate 21. A plurality of glass flat plates 20 having exactly the same structure are used to form a laminated body. FIG. 6B shows a state in which the glass flat plates 20 are laminated at an angle of inclination of 39 degrees with use of a jig 24. The jig 24 is composed of a horizontal plate-shaped base 24a and an inclined side wall 24b fixed which is fixed to the base 24a at an angle of inclination of 39 degrees relative to the base 24a. The glass flat plates 20 are sequentially laminated on the base 24a with the filter film (SWPF) 22 facing upwards. At this time, one of the ends of each glass flat plate 20 is aligned along the inclined side wall 24b, and thereby the step-shaped laminated body 25 is formed in which the glass flat plates 20 are displaced with each other at an equal distance in the face direction. This state is shown in Process (3) in FIG. 5. At this time, one of the ends of each glass flat plate 60 is aligned along the inclined side wall 64b, and thereby the step-shaped laminated body 65 is formed in which the glass flat plates 60 are displaced with each other at an equal distance in the face direction. That is, a laminated body having a substantial parallelogram front view is formed. The glass flat plates 20 are joined to one another with an UV curing-type optical adhesive.

Figure 7A:
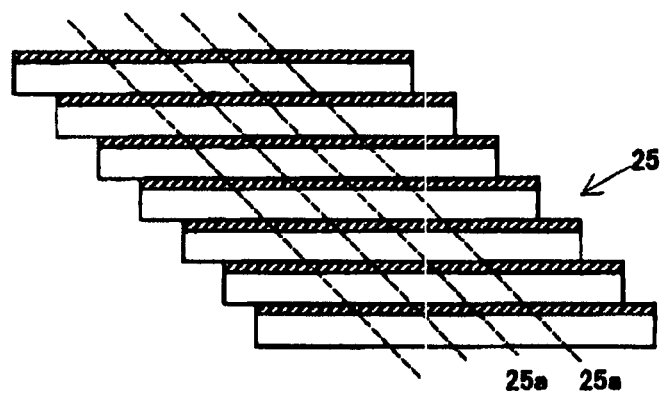
FIGS. 7A to 7F are process drawings for explaining the method for manufacturing a wavelength splitting element of the present invention.
Figure 7B:
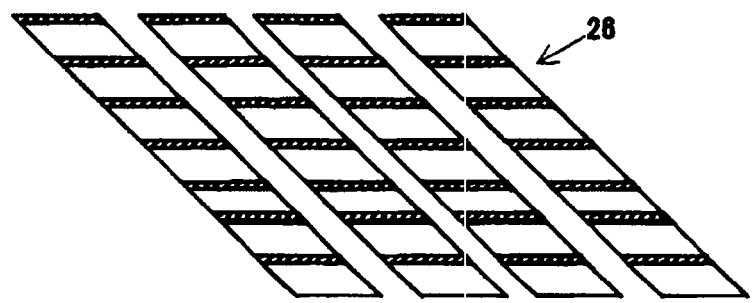
Figure 7C:
Figure 7D:
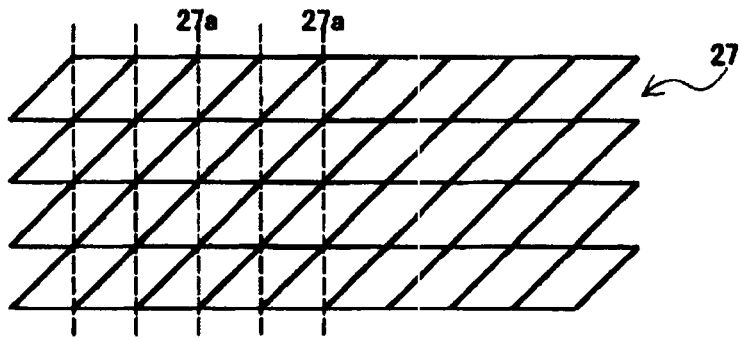
Figure 7E:
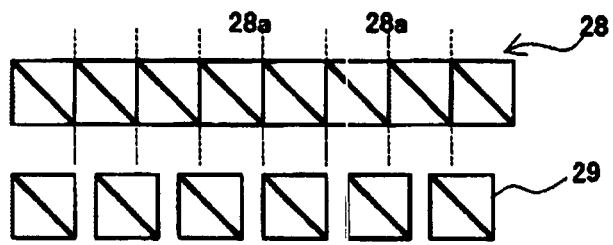
Figure 7F:

Next, as shown in FIG. 7A, the laminated body 25 that has been integrated by adhesive is cut along the dotted lines showing the angle of inclination 39 degrees by a plurality of cutting planes that are in parallel with each other at a given pitch using a wire saw or the like, and thereby split laminated bodies 26 as shown in FIG. 7B are obtained. This state corresponds to Process (4) in FIG. 5. FIG. 7C shows the state in which the split laminated bodies 26 are placed horizontally. Portions with an acute angled protrusion at both ends of each split laminated body 26 may be cut. Alternatively, the split laminated bodies 26 may be tentative adhered and next be cut. This state corresponds to Process (5) in FIG. 5. After top and bottom faces (i.e., cutting planes) of the split laminated bodies 26 are mirror polished and cleaned, a filter film (LWPF, which corresponds to the filter film 56b in FIG. 4) is deposited on one of the faces. This state corresponds to Processes (6) and (7) in FIG. 5. As shown in FIG. 7D, for tentatively adhering a plurality of split laminated bodies 26, at first, the split laminated bodies 26 may be laminated in correct alignment to form the laminated body 27. At this time, paraffin has been applied to the split laminated bodies 26 in advance for tentative adhesion. The tentatively adhered laminated body 27 is cut along the wire saw along cutting planes 27a that are perpendicular to the cutting planes 25a shown in FIG. 7A, and thereby a connected body 28 of the wavelength splitting element shown in FIG. 7E is formed. Next, the cutting planes are mirror polished, and the wavelength splitting element connected body 28 is cut along the dotted lines 28 shown in FIG. 7E, and thereby a wavelength splitting element 29 shown in FIG. 7F is separated and acquired.

Figure 8A:
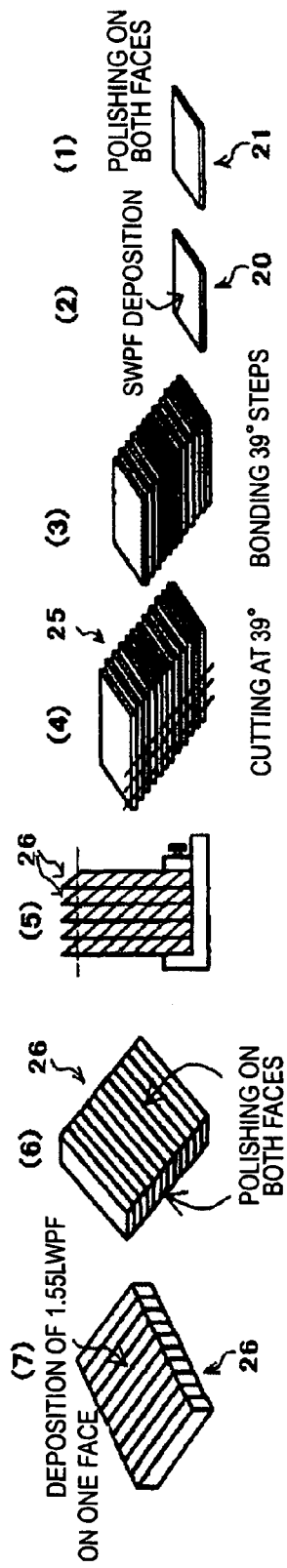
FIG. 8A is a manufacturing process flow diagram and FIGS. 8B and 8C are process drawings for explaining a second method for manufacturing a wavelength splitting element of the present invention.
Figure 8B:
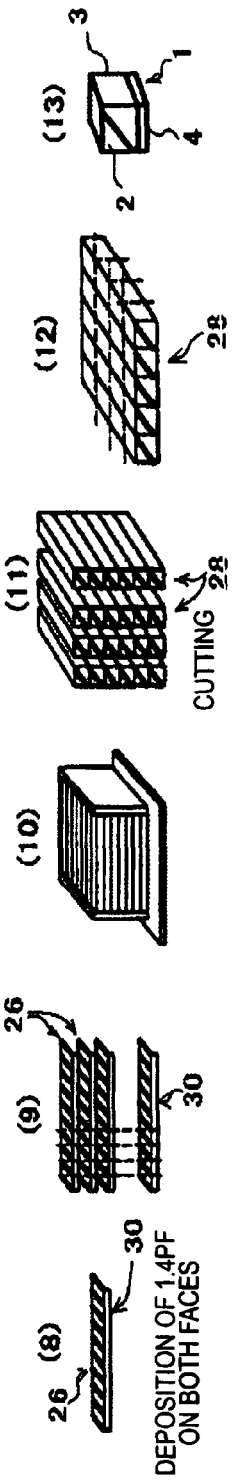
Figure 8C:
Figure 10:
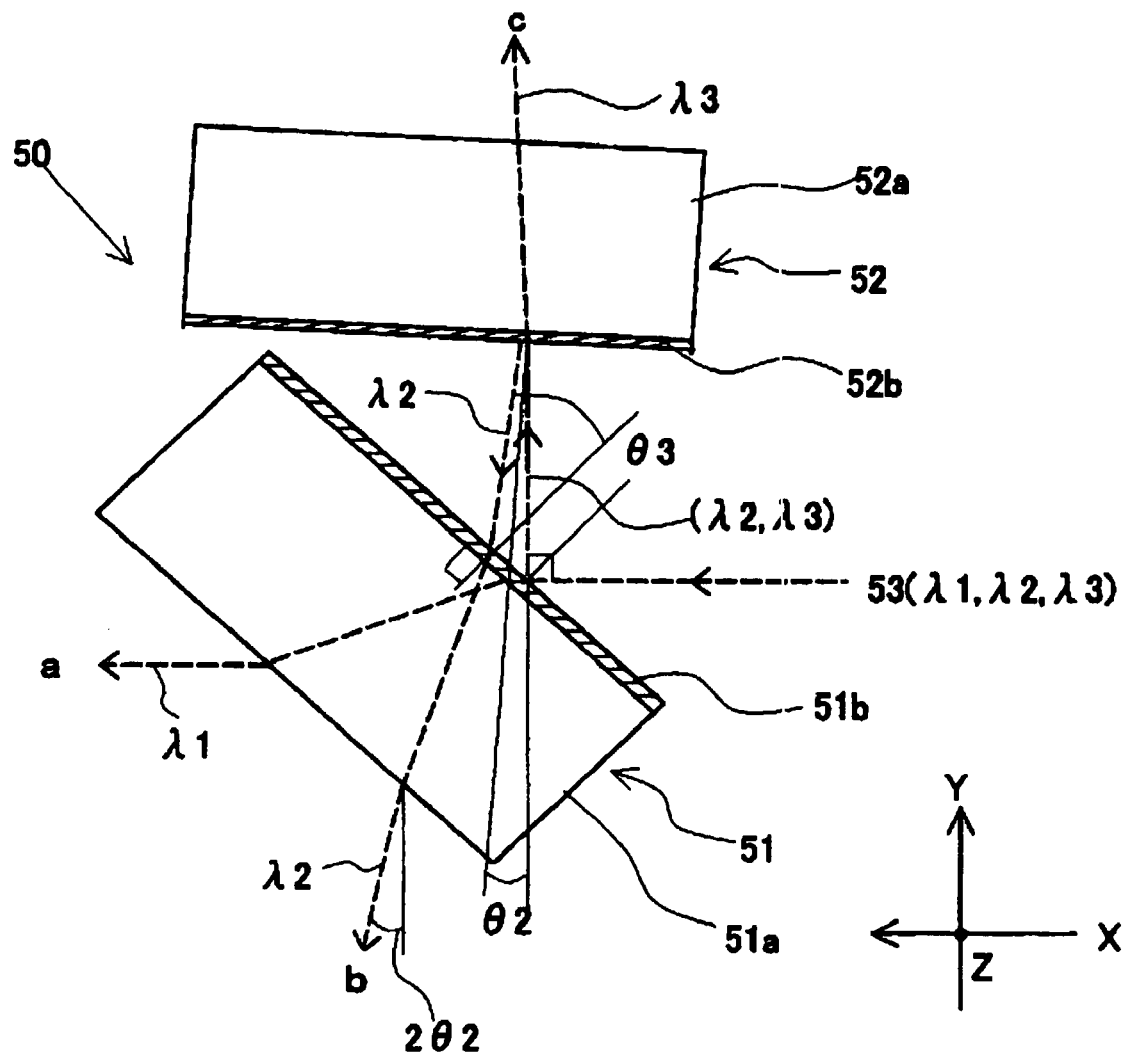
FIG. 10 is a diagram for explaining the operation of a conventional wavelength splitting element.

Next, a second embodiment of a method for manufacturing the wavelength splitting element 1 of the invention shown in FIG. 1 will be explained. The wavelength splitting element 1 is different from the wavelength splitting element 54 shown in FIG. 4 only in that the filter 4 is joined and fixed to the incident face of the filter 55 for a light beam in the wavelength λ2 using adhesive as shown in FIG. 4. The filter 4 is formed by forming filter films 4b and 4c on respective faces of the rectangular plate-shaped light transmission member 4a having approx. 0.5 mm in thickness. Therefore, the method for manufacturing the wavelength splitting element 1 is shown in the manufacturing process flow diagram in FIG. 8A. In FIG. 8A, the processes are the same until Process (7) as the processes shown in the manufacturing process flow diagram in FIG. 5. In Process (8), two processes are added: the process as shown in FIG. 8B of forming a filter 30 by forming a filter film 32 (1.49/1.55 SWPF) and a filter film 33 (1.31/1.49 LWPF) on respective mirror polished faces of a rectangular plate-shaped light transmission member 31 having 5 mm in thickness; and the process as shown in FIG. 8C of joining the filter 30 to the bottom face of the split laminated bodies 26 whose upper face has been formed with a filter film in Process (7).

Next, a third embodiment of a method for manufacturing the wavelength splitting element 7 of the invention shown in FIG. 2 will be explained. The wavelength splitting element 7 is different from the wavelength splitting element 1 shown in FIG. 1, only in that, in place of the filter film 3b provided on the incident face of the filter 3 for a light beam in the wavelength band λ3, a filter 8 is joined to the incident face of the filter film 3a for a light beam in the wavelength band λ3 using adhesive. The filter 8 is formed by forming the filter film 8b (1.49/1.55 LWPF) and the filter film 8c (1.49/1.55 LWPF) on the respective mirror-finished faces of the rectangular plate-shaped light transmission member 8a having 0.5 mm in thickness.

Therefore, the method for manufacturing the wavelength splitting element 7 is as shown in the manufacturing process flow diagram in FIG. 9A. In other words, the processes are the same until Process (6) as the processes in the manufacturing process flow diagram in FIG. 8. In Process (7), however, a filter film is not formed on the mirror-polished faces of the split laminated bodies 26 and only cleaning is carried out. The process of forming the filter 30 in Process (8), which is the same as the process shown in the manufacturing process flow diagram in FIG. 8, is shown in FIG. 9B.

Next, as shown in FIG. 9C, a filter 34 is formed by forming a filter film 36 (1.49/1.55 LWPF) and a filter film 37 (1.49/1.55 LWPF) on the respective mirror-polished faces of the rectangular plate-shaped light transmission member 35 having 0.5 mm in thickness. Next, the process of joining and fixing the filter 30 to the bottom face and the filter 34 to the top face of the split laminated bodies 26 in Process (7) shown in the manufacturing process flow diagram in FIG. 9a.

What is claimed is:

1. A wavelength splitting element for splitting a multiplexed light beam in wavelength bands λ1, λ2 and λ3 into light beams in separate wavelength bands and emitting the split light beams from separate emission ports, comprising:
   a first filter for splitting the multiplexed light beam in the wavelength bands λ1, λ2 and λ3 into a light beam in the wavelength band λ1 that the first filter passes in a first direction and into a light beam in the wavelength bands λ2 and λ3 that the first filter reflects;
   a second filter, which is provided in the direction of the light beam in the wavelength bands λ2 and λ3 that has been reflected by the first filter, for splitting the light beam in the wavelength bands λ2 and λ3 that has been reflected by the first filter into a light beam in the wavelength band λ3 that the second filter passes in a second direction and into a light beam in the wavelength band λ2 that the second filter reflects in a third direction; and
   a third filter, which is provided in the direction of the light beam that has been reflected by the second filter, for passing the light beam in the wavelength band λ2 that has been reflected by the second filter, wherein
   the first filter has characteristics to pass the light beam in the wavelength band λ2 that has been reflected by the second filter and incident to the first filter again in the third direction depending on an incident angle, and
   the third filter has characteristics to pass only the light beam in the wavelength band λ2 out of the light beams that the first filter passes in the third direction.

2. A wavelength splitting element for splitting a multiplexed light beam in wavelength bands λ1, λ2 and λ3 into light beams in separate wavelength bands and emitting the split light beams from separate emission ports, comprising:
   a first filter for splitting the multiplexed light beam in the wavelength bands λ1, λ2 and λ3 into a light beam in the wavelength band λ1 that the first filter passes in a first direction and into a light beam in the wavelength bands λ2 and λ3 that the first filter reflects;
   a fourth filter, which is provided in the direction of the light beam in the wavelength bands λ2 and λ3 that has been reflected by the first filter, for splitting the light beam in wavelength bands λ2 and λ3 that has been reflected by the first filter into a light beam in the wavelength band λ3 that the fourth filter passes in a second direction and into a light beam in the wavelength band λ2 that the fourth filter reflects in a third direction;

a third filter, which is provided in the direction of the light beam that has been reflected by the fourth filter, for passing the light beam in the wavelength band λ2 that has been reflected by the fourth filter; and a second filter that is disposed between the first filter and the fourth filter, wherein the first filter has characteristics to pass the light beam in the wavelength band λ2 that has been reflected by the fourth filter and incident to the first filter again in the third direction depending on an incident angle, the third filter has characteristics to reflect the light beam in the wavelength band λ3 and to pass only the light beam in the wavelength band λ2 out of the light beams that the first filter passes in the third direction, and the fourth filter has characteristics to reflect the light beam in the wavelength band λ2 and pass the light beam in the wavelength band λ3 or higher.

3. The wavelength splitting element according to claim 1, wherein a filter film of the first filter is formed on a joint surface of a rectangular solid-shaped body that is formed by joining two slopes of right triangular-shaped prisms, and a filter film of the second filter is formed on one emission surface of the rectangular solid-shaped body, and the third filter formed with a first filter film and a second filter film on respective sides of a plate-shaped optical member is joined to the other emission surface of the rectangular solid-shaped body.

4. The wavelength splitting element according to claim 2, wherein a filter film of the first filter is formed on a joint surface of a rectangular solid-shaped body that is formed by joining two slopes of triangular-shaped prisms, the fourth filter formed with a first filter film and a second filter film on respective sides of a plate-shaped optical member is joined to one emission surface of the rectangular solid-shaped prism, and the third filter formed with a first filter film and a second filter film on respective sides of a plate-shaped optical member is joined to the other emission surface of the rectangular solid-shaped prism.

5. An optical module for splitting a multiplexed light beam in wavelength bands λ1, λ2 and λ3 into light beams in separate wavelength bands, comprising:

a phototransistor for detecting the split light beams in separate wavelength bands at separate emission ports; and a wavelength splitting element according to claim 1.

6. A method for manufacturing a wavelength splitting element formed by joining slopes of two triangular-shaped prisms comprising:

forming a first filter film on a rectangular plate-shaped optical member;

forming a laminated body by laminating a plurality of rectangular plate-shaped optical members formed with the first filter film via an adhesive, and sequentially laminating the rectangular plate-shaped optical members with displaced face directional positions so that a plane connecting ends of the plate-shaped optical members and a plate face of the plate-shaped optical member creates an angle of inclination of 39 degrees;

cutting the laminated body that has been formed by laminating the plurality of rectangular plate-shaped optical members with adhesive along the angle of inclination of 39 degrees into a plurality of split laminated bodies by a plurality of cutting planes that are in parallel with each other at a given pitch;

mirror polishing the cutting plane of the split laminated body formed in the cutting process;

forming a second filter film on one mirror polished face of the split laminated body;

tentatively adhering the plurality of split laminated bodies formed with the second filter film with an tentative adhesive so that the first filter films are laminated in correct alignment;

separating the plurality of split laminated bodies that have been tentatively adhered by the tentative adhesive along a cutting plane which is perpendicular to the cutting plane in the cutting process, and thereby forming a tentatively adhered laminated body;

mirror-polishing the cutting plane of the tentatively adhered laminated body obtained by the separating process;

forming a wavelength splitting element connected body in which a plurality of wavelength splitting elements are connected in series via the tentative adhesive by cutting the tentatively adhered laminated body along the direction which is perpendicular to the cutting plane at a given interval; and splitting the wavelength splitting element connected body into separate wavelength splitting elements by melting the tentatively adhesive composing the wavelength splitting element connected body.

7. A method for manufacturing a wavelength splitting element formed by joining slopes of two triangular-shaped prisms comprising:

forming a first filter film on a rectangular plate-shaped optical member;

forming a laminated body by laminating a plurality of rectangular plate-shaped optical members formed with the first filter film via an adhesive, and sequentially laminating the rectangular plate-shaped optical members with displaced face directional positions so that a plane connecting ends of the plate-shaped optical members and a plate face of the plate-shaped optical member creates an angle of inclination of 39 degrees;

cutting the laminated body that has been formed by laminating the plurality of rectangular plate-shaped optical members with adhesive along the angle of inclination of 39 degrees into a plurality of split laminated bodies by a plurality of cutting planes that are in parallel with each other at a given pitch;

mirror-polishing the cutting plane of the split laminated body formed in the cutting process;

forming a second filter film on one mirror polished face of the split laminated body;

forming third and fourth filter films on respective faces of a rectangular plate-shaped optical member;

joining the plate-shaped optical member formed with the third and fourth filter films to the split laminated bodies formed with second filter films;

tentatively adhering the split laminated bodies joined with the plate-shaped optical member formed with the third and fourth filter films with an tentative adhesive so that the first filter film is laminated in correct alignment;

separating the plurality of split laminated bodies that have been tentatively adhered by the tentative adhesive along a cutting plane which is perpendicular to the cutting plane in the cutting process, and thereby forming a tentatively adhered laminated body;

mirror-polishing the cutting plane of the tentatively adhered laminated body obtained by the separating process;

forming a wavelength splitting element connected body in which a plurality of wavelength splitting elements are connected in series via the tentative adhesive by cutting the tentatively adhered laminated body along the direction which is perpendicular to the cutting plane at a given interval; and splitting the wavelength splitting element connected body into separate wavelength splitting elements by melting the tentatively adhesive composing the wavelength splitting element connected body.

8. A method for manufacturing a wavelength splitting element formed by joining slopes of two triangular-shaped prisms comprising:

forming a first filter film on a rectangular plate-shaped optical member;

forming a laminated body by laminating a plurality of rectangular plate-shaped optical members formed with the first filter film via an adhesive, and sequentially laminating the rectangular plate-shaped optical members with displaced face directional positions so that a plane connecting ends of the plate-shaped optical members and a plate face of the plate-shaped optical member creates an angle of inclination of 39 degrees;

cutting the laminated body that has been formed by laminating the plurality of rectangular plate-shaped optical members with adhesive along the angle of inclination of 39 degrees into a plurality of split laminated bodies by a plurality of cutting planes that are in parallel with each other at a given pitch;

mirror-polishing the cutting plane of the split laminated body formed in the cutting process;

forming third and fourth filter films on respective faces of a second rectangular plate-shaped optical member;

joining the second plate-shaped optical member formed with the third and fourth filter films to one face of the split laminated body;

forming fifth and sixth filter films on respective faces of a third rectangular plate-shaped optical member;

joining the third plate-shaped optical member formed with the fifth and sixth filter films to the other face of the split laminated body;

tentatively adhering the split laminated bodies joined with the third rectangular plate-shaped optical member formed with the fifth and sixth filter films with an tentative adhesive so that the first filter film is laminated in correct alignment;

separating the plurality of split laminated bodies that have been tentatively adhered by the tentative adhesive along a cutting plane which is perpendicular to the cutting plane in the cutting process, and thereby forming a tentatively adhered laminated body;

mirror-polishing the cutting plane of the tentatively adhered laminated body obtained by the separating process;

forming a wavelength splitting element connected body in which a plurality of wavelength splitting elements are connected in series via the tentative adhesive by cutting the tentatively adhered laminated body along the direction which is perpendicular to the cutting plane at a given interval; and splitting the wavelength splitting element connected body into separate wavelength splitting elements by melting the tentatively adhesive composing the wavelength splitting element connected body.

9. The manufacturing method according to claim 6, wherein a process of removing acute angled portions at both ends of the split laminated body is interposed before the tentative adhesive process.

10. The manufacturing method according to claim 6, wherein a UV adhesive is used as the adhesive.

11. The manufacturing method according to claim 6, wherein paraffin is used as the tentative adhesive.

12. The manufacturing method according to claim 7, wherein a process of removing acute angled portions at both ends of the split laminated body is interposed before the tentative adhesive process.

13. The manufacturing method according to claim 8, wherein a process of removing acute angled portions at both ends of the split laminated body is interposed before the tentative adhesive process.

* * * * *